(12) United States Patent
Bewlay et al.

(10) Patent No.: US 7,497,986 B2
(45) Date of Patent: Mar. 3, 2009

(54) APPARATUS FOR INCORPORATING A GASEOUS ELEMENTAL COMPONENT INTO A MOLTEN METAL, AND RELATED ARTICLES, PROCESSES, AND COMPOSITIONS

(75) Inventors: Bernard Patrick Bewlay, Schenectady, NY (US); Dennis Joseph Dalpe, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 641 days.

(21) Appl. No.: 10/932,128

(22) Filed: Sep. 1, 2004

(65) Prior Publication Data
US 2006/0042725 A1    Mar. 2, 2006

(51) Int. Cl.
C23C 8/24    (2006.01)
(52) U.S. Cl. .................. 266/201; 266/207; 266/241
(58) Field of Classification Search ............... 266/201, 266/202, 207, 241
See application file for complete search history.

(56) References Cited

U.S. PATENT DOCUMENTS

| | | | |
|---|---|---|---|
| 3,775,091 A | 11/1973 | Clites et al. | |
| 4,738,713 A * | 4/1988 | Stickle et al. | 75/10.18 |
| 4,923,508 A | 5/1990 | Diehm et al. | |
| 5,416,793 A * | 5/1995 | Hugo et al. | 373/142 |
| 5,427,173 A | 6/1995 | Das et al. | |
| 5,833,773 A | 11/1998 | Bewlay et al. | |
| 5,932,033 A | 8/1999 | Jackson et al. | |
| 6,059,015 A | 5/2000 | Bewlay et al. | |
| 6,419,765 B1 | 7/2002 | Jackson et al. | |
| 6,676,381 B2 | 1/2004 | Subramanian et al. | |

OTHER PUBLICATIONS

"High-Temperature Nitridation of Nb-Ti Alloys in Nitrogen", V. Buscaglia et al, Journal of Alloys and Compounds, 283 (1999), pp. 241-259 Dec. 1999.

* cited by examiner

*Primary Examiner*—Scott Kastler
(74) *Attorney, Agent, or Firm*—Francis T. Coppa

(57) ABSTRACT

An apparatus for incorporating an elemental component in gaseous form into a molten metal is described. The apparatus comprises a container for holding the molten metal; means for cooling the container; heating means for maintaining the metal in the molten state; and a canopy which covers the top of the container. The apparatus also includes at least one aperture through which a desired gaseous material can be fed from a gas source. A related method for incorporating an elemental component in gaseous form into a molten metal is also described. The method includes the step of providing the metal in a container apparatus as described above, and feeding the gaseous elemental component from a gas source into the container, while maintaining the metal in the molten state. Articles prepared by such a method are also disclosed, as well as niobium base composites which comprise niobium, silicon, and nitrogen.

18 Claims, 6 Drawing Sheets

APPARATUS FOR INCORPORATING A GASEOUS ELEMENTAL COMPONENT INTO A MOLTEN METAL, AND RELATED ARTICLES, PROCESSES, AND COMPOSITIONS

BACKGROUND OF THE INVENTION

This invention relates generally to metals and metal alloys used in high temperature applications. More particularly, the invention relates to methods and devices for incorporating elemental components in gaseous form into metal compositions, to enhance the properties thereof.

A variety of metals and metal alloys are especially useful for high temperature equipment, e.g., engines and other machinery. As one example, superalloys are the materials of choice for turbine engine components, such as turbine buckets, nozzles, blades, and rotors. The superalloys are often based on nickel, although some are based on cobalt, or combinations of nickel and cobalt. These materials provide the chemical and physical properties required for turbine operating conditions, i.e., high temperature, high stress, and high pressure. As an illustration, an airfoil for a modern jet engine can reach temperatures as high as about 1100° C., which is about 80-85% of the melting temperature of most nickel-based superalloys.

The nickel-based superalloys continue to be tremendously popular because of their high level of performance. However, research efforts in recent years have also focused on alternative materials for high temperature components, such as the turbine engines. Examples of the alternative materials are various refractory metal intermetallic composite (RMIC) materials. Many of these are based on silicon (Si) and at least one of niobium (Nb) and molybdenum (Mo). For example, niobium-based RMIC's often include silicon, titanium (Ti), hafnium (Hf), chromium (Cr), and aluminum (Al).

RMIC materials are described in various references, such as U.S. Pat. No. 5,932,033 (Jackson and Bewlay); U.S. Pat. No. 5,942,055 (Jackson and Bewlay); and U.S. Pat. No. 6,419,765 (Jackson, Bewlay, and Zhao). Many of the RMIC's have melting temperatures of about 1700° C. This characteristic makes such materials very promising for potential use in applications in which the temperatures exceed the current service limit of nickel-based superalloys. Many RMIC's also possess various other attributes, e.g., relatively low density, as compared to nickel superalloys.

The RMIC composites usually have a multi-phase microstructure. For example, the microstructure may comprise a metallic Nb-base phase and an intermetallic metal silicide phase. As described in U.S. Pat. No. 5,833,773 (Bewlay and Jackson), the metal silicide phase sometimes includes an $M_3Si$ silicide and an $M_5Si_3$ silicide, where M is Nb, Ti or Hf. The materials are considered to be composites that combine high-strength, low-toughness silicides with a lower-strength, higher-toughness Nb-based metallic phase. Some of the RMIC composites include other phases as well. For example, they may further include a chromium-based Laves-type phase modified with silicon. Such a phase promotes oxidation resistance, and useful materials of this type are described in some of the patents mentioned above. The composites are often formed in situ by directional-solidification of the alloy.

The selection of phases and element constituents in the RMIC's is aimed at achieving a balance of properties which are important for a particular end use application. An example of the properties alluded to above include strength (fracture strength and rupture strength), toughness, density, oxidation resistance, and creep resistance. In the case of turbine engines, the appropriate balance of properties is greatly influenced by the ever-increasing need to achieve higher operating temperatures for the component.

Thus, there continues to be considerable interest in even greater improvements in RMIC properties—especially at both high and low temperatures. This need is pronounced in the case of gas turbines, which often cycle between room temperature and 1100° C., as discussed above. New RMIC materials would therefore be welcome in the art. Furthermore, new techniques for making the improved RMIC materials would also be of great interest to practitioners in the art.

BRIEF DESCRIPTION OF THE INVENTION

One embodiment of this invention is directed to an apparatus for incorporating an elemental component in gaseous form into a molten metal. The apparatus comprises:
(a) a container for holding the molten metal, having a sidewall, a top, and a bottom, which define an interior of the container;
(b) means for cooling the container;
(c) heating means for maintaining the metal in the molten state; and
(d) a canopy which covers the top of the container, and includes at least one aperture through which a gas conduit communicates, wherein a first end of the conduit is attached to a gas source for the elemental component.

Another embodiment relates to a method for incorporating an elemental component in gaseous form into a molten metal. The method comprises the following steps:
(i) providing the metal in a container apparatus, wherein the container has a sidewall, a top, and a bottom, which define a container interior, said apparatus further comprising means for cooling the container, and heating means for maintaining the metal in a molten state; and
(ii) feeding the gaseous elemental component from a gas source into the container, through a conduit in a canopy which covers the top of the container, while maintaining the metal in the molten state, so that the gaseous elemental component becomes incorporated within the molten metal. Articles prepared by such a method constitute another embodiment of the invention.

An additional embodiment is directed to a niobium (Nb) base composite, comprising Nb, silicon (Si), and nitrogen (N). The composite usually has a microstructure comprising a metallic Nb-base phase and a metal silicide phase.

DETAILED DESCRIPTION OF THE INVENTION

Figure 1:
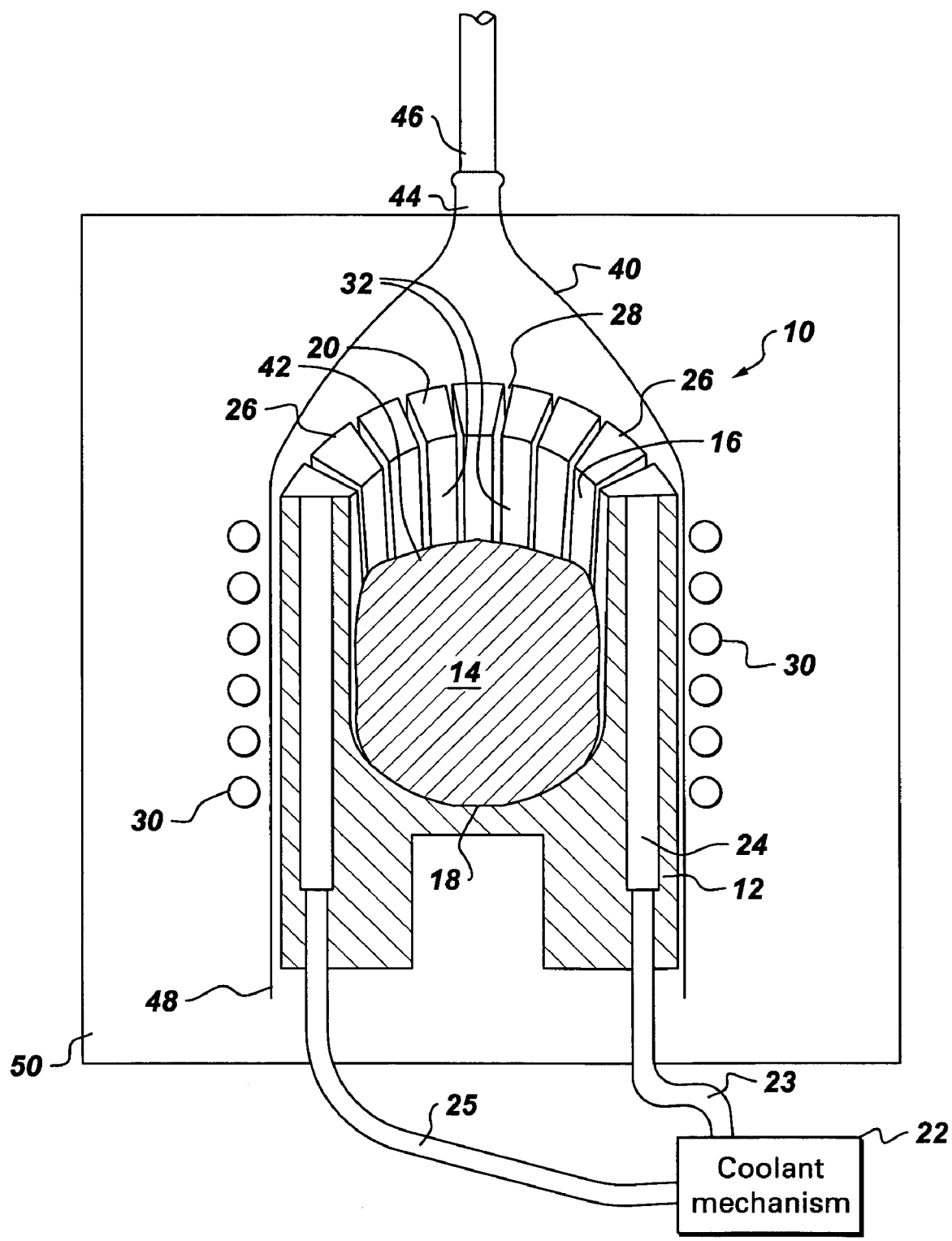
FIG. 1 is a perspective, cross-sectional view of an apparatus for introducing a gaseous elemental component into a molten metal, according to the present invention.

An exemplary apparatus for incorporating an elemental component in gaseous form into a molten metal is depicted in FIG. 1. Apparatus 10 includes container 12, which is capable of holding a molten metal charge 14. Container 12 includes sidewall or peripheral wall 16, and a bottom 18. As discussed below, sidewall 16 is often, but not always, divided into multiple segments. At least one gap is present between two of the segments, as discussed below.

In this embodiment, the top 20 of the container is considered to be the top portion of the sidewall. The container can be formed of a variety of materials, such as metals, metal alloys, ceramics, and composite materials. Choice of a particular material will depend on various factors. They include: the composition and the amount of the molten metal charge; its melting point; the heating mechanism for the charge; the type of method used to cool the container (as described below); and the potential reactivity between the container material and the metal charge. In many preferred embodiments, the container is made from a metal or metal alloy. Non-limiting examples include copper, molybdenum, tungsten, tantalum, and alloys thereof. Copper is often preferred.

In most embodiments, the apparatus includes a mechanism for cooling the container, e.g., cooling its sidewall. As described below, cooling of the container can be undertaken to allow a skull to form between the sidewall and the molten material. A variety of well-known cooling mechanisms may be employed. Water cooling is often preferred.

For the sake of brevity, one type of possible water-cooling mechanism 22 is depicted in simple form in FIG. 1, with a generalized connection to coolant passageway 24. Mechanism 22 may comprise a conventional water manifold assembly for supplying the water to at least a portion of sidewall 16. The coolant passageway 24 would usually be incorporated into a number of sidewall portions of the container, in the case of a multi-segment container. The manifold assembly could be connected to a suitable water source (not shown), and would include means, such as conventional pumping equipment, for circulating water to coolant passageway 24. A useful system of this type is described in U.S. Pat. No. 4,923,508 for Diehm et al ("Diehm"), which is incorporated herein by reference. Coolant passageway 24 could be supplied with coolant from coolant inlet 23. A coolant outlet/return tube 25 would complete the coolant circuit. (As described in Diehm, the coolant passage and return tube can be disposed concentrically with each other. Moreover, the coolant passageway could also extend below bottom 18 of the container, to provide additional cooling to that region). Other details regarding the coolant-circulating system are well-known to those skilled in the art.

Moreover, alternative cooling systems could be used. As an example, systems based on other liquid coolants are possible. Non-limiting examples of the coolant materials include glycol-water mixtures, water-oil-mixtures, and liquid metals, e.g., sodium- or potassium-containing eutectics. The container could also be cooled by various gas-cooling systems as well. Again, those skilled in the art will be able to determine the most appropriate coolant system, based on container-type, molten metal characteristics, and the like.

Frequently, container 12 is a crucible. Various types of crucibles may be employed. When metal charge 14 is melted and maintained in that state by an induction skull melting process, crucible 12 is often a multiple-segment, cold-wall (e.g., water-cooled) crucible—usually made of copper. Crucibles of this type are well-known in the art, as described in U.S. Pat. No. 6,059,015 (Bewlay and Dalpe) and U.S. Pat. No. 5,427,173 (Das et al), both incorporated herein by reference, as well as in the Diehm patent referenced above. Crucibles are also described in U.S. Pat. No. 3,775,091 (Clites et al) and U.S. Pat. No. 3,702,368 (Hukin), which are also incorporated herein by reference.

As shown in FIG. 1, the sidewall of such a crucible is usually formed by a number of vertical segments 26. The segments (sometimes called "fingers") are usually disposed in side-by-side relation about a longitudinal axis of the crucible. Each segment thus has an inner wall facing the axis for forming, along with the other segments, an interior region of the crucible for holding the molten metal. The segments are separated from each other by gaps 28, as further discussed below. Each longitudinal gap usually includes an inner portion communicating with the interior region of the crucible, and an outer portion communicating with the exterior of the sidewall.

Apparatus 10 further includes a heating mechanism. The heating mechanism can be used to initially melt solid metal materials within container 12, and to then maintain the resulting metal charge 14 in the molten state. Non-limiting examples of heating techniques include arc melting (e.g., plasma arc melters or vacuum arc melters, using consumable or non-consumable electrodes); electron beam melting, plasma melting, and various induction mechanisms. Those skilled in the art are familiar with the details regarding each of these techniques. Modifications might be undertaken so that the particular heating technique does not interfere with the use of the canopy described below.

In some preferred embodiments (e.g., in the case of induction skull melting), heating is carried out by an induction mechanism. Induction mechanisms are well-known in the art, and are described in at least some of the patents referenced above. The induction mechanism generates an electromagnetic field, and is capable of inducing an electrical current (usually AC) in the metal charge within the container, thereby melting the metal. As described in U.S. Pat. No. 6,059,015, the induction mechanism often comprises a heating coil which coaxially surrounds the container holding the metal charge. Other positions for the heating coil relative to the container are also possible.

In FIG. 1, heating coil 30, shown from a cross-sectional perspective, is connected to a suitable power source (not shown). As those skilled in the art understand, the magnetic field produced by the energized coil heats the metal charge in the crucible. In the case of induction skull melting, where container 12 is a segmented, metal crucible, the magnetic field stirs the liquid metal pool formed in the crucible. This usually results in the formation of a thin layer of metal which remains frozen against the bottom of the crucible, forming the skull. Proper adjustment of the frequency and power levels for the coil causes the sides of the liquid metal pool to be pushed inwardly, away from the interior walls of the crucible. This desirable absence of physical contact with the sidewall prevents the crucible segments from being short-circuited, and also reduces heat loss to the crucible.

As mentioned above, vertical segments 26 are separated by gaps 28 (FIG. 1). The gaps serve a well-known purpose, as described in the Diehm patent. They function, in part, to maintain sufficient electrical resistance between segments 26, around the circumference of container 12. The electrical resistance breaks up undesirable eddy currents in the container, thereby allowing the induction field generated by coil 30 to heat and melt metal charge 14 to its molten state. The size of the gaps (e.g., their width) can vary somewhat, as mentioned in the Diehm patent and other references. In the case of induction skull melting, the gaps should have a width small enough to substantially prevent the entry of molten metal from container 12, prior to formation of the solidified metal skull (not shown) against the container's inner wall surfaces 32. In some instances, the gaps are filled or partially filled with a dielectric material, e.g., a ceramic or a polymer such as polytetrafluoroethylene.

Apparatus 10 further includes a canopy 40, which covers the top of container 12. The canopy serves an important function, by containing and directing the gaseous elemental component to the top surface 42 of metal charge 14. As shown in FIG. 1, the lower portion of canopy 40 is substantially surrounded by heating coil 30, although that is not always necessary.

The canopy can be formed from a variety of materials. Non-limiting examples include glass and ceramics (e.g., alumina, sapphire, spinel, yttrium-aluminum-garnet (YAG)). High-temperature polymers (e.g., those having a melting temperature of greater than about 200° C.) could also be used, as well as combinations of any of the foregoing materials. Choice of a particular material will depend on various factors, such as the type of gas being pumped into the apparatus, and the composition and melting point of the metal charge. In some preferred embodiments, the canopy is made from a temperature-resistant glass, such as quartz glass or Pyrex™ glass.

Canopy 40 may simply be placed over the top 20 of container 12, resting on the upper portion of vertical segments 26. It is not usually critical that the canopy form a gas-tight seal with the container. However, in some cases, a seal may be desirable, e.g., in the case of gasses which might represent environmental- or health hazards. In those instances, a variety of techniques could be used to provide a suitable seal. For example, a gasket formed of rubber or another suitable material could be attached at an interface between the inside of the canopy and the outside surfaces of the vertical segments.

The size and shape of the canopy can vary considerably, depending on many of the factors mentioned above, e.g., the type of gaseous component and metal charge. In general, the canopy has an interior volume sufficient to accommodate an excess amount of the gaseous elemental component. As used herein, an "excess amount" of the gaseous elemental component is an amount substantially greater than the equilibrium concentration of the gaseous species in the metal charge. The excess amount should be that which is sufficient to combine with the metal charge to form the desired alloy products, in quantities specified for a particular end use.

The "interior volume" under the canopy is meant to describe the region which is generally above top portion 20 of container 12. In some preferred embodiments, the interior volume under the canopy and above the top of the container should be greater than about 35% to about 100% of the volume of molten metal in the container. As an example in the case of a cylindrical crucible having a diameter of about 4 inches (10.2 cm), a dome-shaped canopy of approximately the same base diameter would typically have a height of about 2 cm to about 15 cm. Those skilled in the art will be able to select the proper size and shape of the canopy for a given set of process conditions, without undue experimentation.

Many different shapes for the canopy are possible. Non-limiting examples include dome or bell shapes, as well as generally spherical shapes; polyhedron shapes (e.g., hexahedrons such as cubes and the like), prism or pyramid shapes, cylinder or cone shapes, ellipsoid or parabaloid shapes, and many irregular shapes. The most appropriate shape for a specific process embodiment can easily be determined, in view of the various considerations outlined herein.

Canopy 40 includes at least one aperture 44, through which a suitable gas conduit 46 communicates. The aperture is the entry point for the gaseous elemental source. Its size (e.g., diameter) can vary considerably, and will be determined in part by the typical volume of gas being introduced into container 12. Usually, the aperture is circular, and has a diameter of about 0.2 cm to about 1.5 cm. The position of the aperture on the canopy is not critical. Moreover, multiple apertures might sometimes be employed.

Gas conduit 46 is connected to a suitable gas source (not shown). Engineering details for this type of connection (e.g., conduit materials, hose-coupling and valve specifications, and the like) are well-known, and need not be discussed in detail here. Many variations are possible. For example, multiple conduits could be fed through aperture 44, each carrying a different gas or mixtures of gasses.

Figure 2:
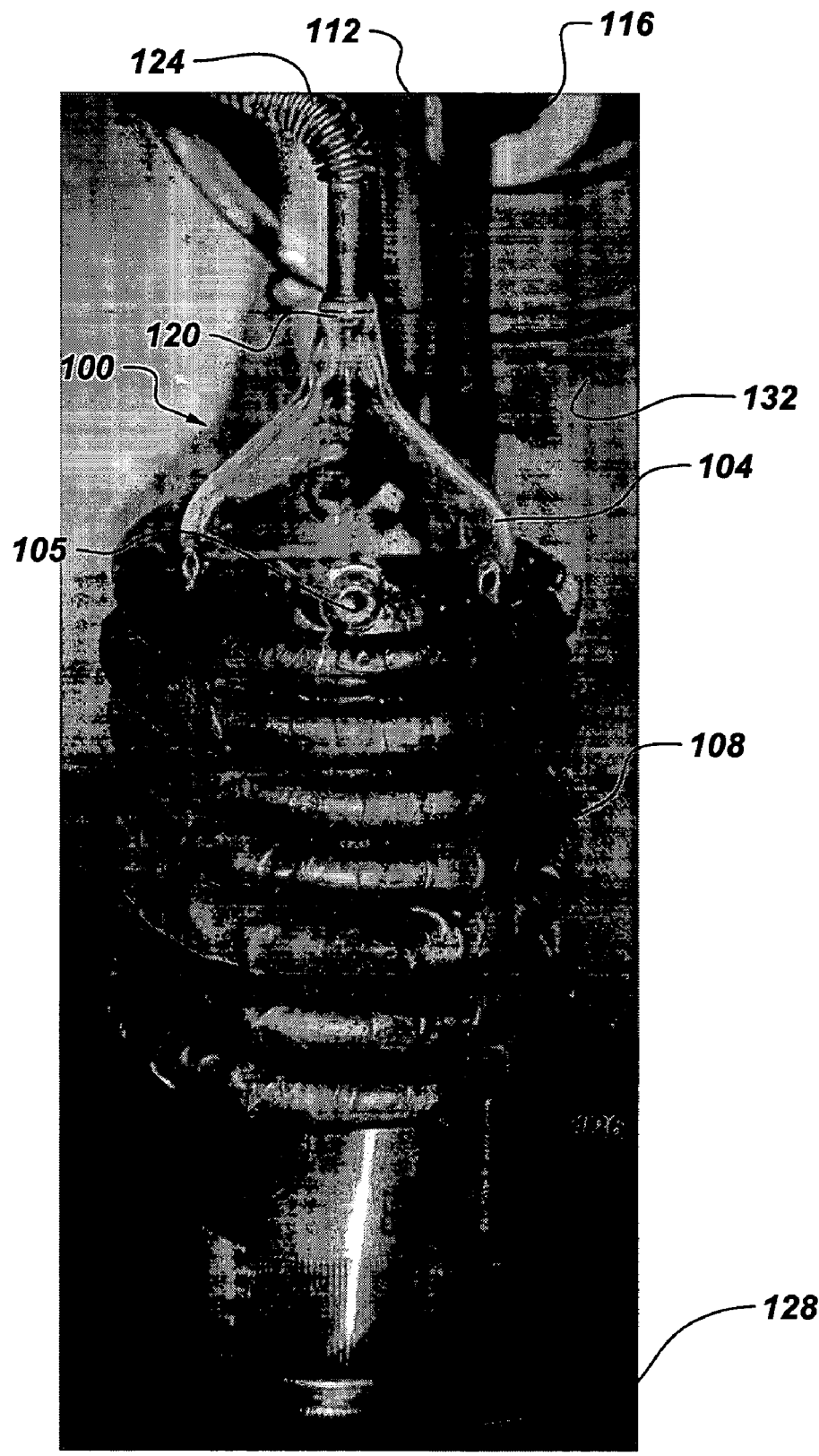
FIG. 2 is a photograph of an experimental apparatus for the present invention.

Canopy 40 may further include one or more vent holes. The vent holes are not depicted in FIG. 1, but are shown in the photograph of FIG. 2, discussed below. The vent holes function as pressure-relief sites. However, they may not be necessary if high gas pressure would not be a substantial problem, or if there are other openings between the canopy and container 12. (For example, there may be openings between the outside surface of the container and bottom rim 48 of the canopy, as shown in FIG. 1.). The size and location of the vent holes may vary considerably, depending on many of the factors discussed above. Moreover, those skilled in the art can conceive of other venting methods to relieve gas pressure within the container.

Usually, apparatus 10 is situated within an enclosure 50 (partially depicted). Enclosures and reaction chambers suitable for containing thermal systems of this type are well-known in the art. They can be in many shapes and sizes, depending on the particular process being carried out. They can also be formed of a variety of materials, such as steel, stainless steel, aluminum, and glass. The enclosures are often employed to provide a vacuum, or an inert gas atmosphere, e.g., one of argon, helium, and the like.

In carrying out the process of this invention, the metal charge is usually placed in container 12, prior to placement of canopy 40 over the top of the container. (Enclosure 50 is typically evacuated prior to melting of the charge, and then back-filled with an inert gas, but variations in this procedure are possible). The charge may be in solid form, e.g., in the form of particles, powder, chunks, fibers, rods, flakes, or some combination thereof. If the charge contains more than one type of material, the different materials may be mixed beforehand, e.g., dry mixing. Alternatively, the metal charge may be in the form of a previously-melted material, or mixture of materials. Such materials can be melted by many different techniques, such as those mentioned above. The molten material can then be poured or pumped into the container. (Alternatively, container 12 could be separated from the rest of the apparatus, and filled with the charge. The container could then be loaded from below the induction coil, e.g., by way of a support shaft, as mentioned below).

The metal charge can comprise a variety of different metals. (As used herein, the term "metals" is meant to also include metal alloys). Thus, the metal charge may contain a single metal, e.g., a single refractory metal such as tungsten, tantalum, or molybdenum; or may contain alloys of more than one metal.

Frequently, the metal charge comprises a refractory metal intermetallic composite (RMIC) material, as mentioned previously. These materials include, but are not limited to, silicon and at least one of niobium and molybdenum. Thus, examples include niobium-silicon alloys (sometimes referred to as "niobium silicides") and molybdenum-silicon alloys. As described below, the RMIC materials may also include a variety of other elements, such as titanium, hafnium, aluminum, and chromium. The melting point for a metal charge based on these RMIC materials will of course depend on the individual constituents of the RMIC, but is usually in the range of about 1500° C. to about 2100° C.

The gaseous elemental component being incorporated into the molten metal can also comprise a wide variety of materials. Choice of a particular material will depend on the identity of the molten metal charge, and how it is to be modified with the additional elemental component. As non-limiting examples, the gaseous elemental component could comprise nitrogen, oxygen, silicon, carbon, or mixtures of any of the foregoing. Moreover, the gaseous component could further comprise various carrier gasses, such as helium, argon, and the like. Precursor gasses could also be used, i.e., those which decompose or are otherwise transformed to yield the desired gaseous component. Procedures for storing and handling all of these gasses are well-established.

When the metal charge is an RMIC material such as a niobium silicide, the gaseous elemental component could be nitrogen. Compounds which contain nitrogen may also be used as the nitrogen source. Non-limiting examples include the various nitrogen oxides ($NO_2$, $NO$, $N_2O_3$, $N_2O_4$, and the like); and nitrogen trifluoride ($NF_3$). The addition of nitrogen to molten niobium silicide can improve the high temperature- and/or low temperature properties of the resulting alloys.

Moreover, in some instances, the molten metal charge could primarily comprise a refractory composition, e.g., one which was primarily molybdenum, tungsten, or niobium. In that case, the gaseous elemental component might comprise a nitrogen-containing gas and a silicon-containing gas such as silane. (These gasses could be fed into container 12 (FIG. 1) as a pre-mixture, or through separate feed conduits). The use of the silicon-containing gas and the nitrogen-containing gas can result in the formation of the nitrogen-modified refractory-silicide materials described below.

After the metal charge has been placed in container 12, canopy 40 can be put into place, either manually or by way of any suitable mechanical device. If the charge is in solid form, it can be melted at this time, by one of the heating methods mentioned above. In the specific example exemplified in FIG. 1, induction melting is usually carried out in a suitable, water-cooled crucible. Induction coil 30 is connected to an induction power supply (not shown). This type of power supply usually operates at a power level in the range of about 10 kW to about 50 kW, and a frequency of about 10 kHz to about 500 kHz. The specific power level and frequency will depend in part on the type of container, and the composition of the metal charge. As mentioned above, the applied power in an induction system is capable of levitating the melt, thereby minimizing contact between the melt and the inside walls of the container. (Skull formation usually occurs as the metal charge melts and then freezes at the base of the crucible).

Gas flow from gas conduit 46 into container 12 is usually initiated when metal charge 14 reaches a desired temperature, in the molten state. The flow-rate of the gas (or multiple gasses) can vary significantly. The flow rate depends in large part on the type of gasses being used, the composition and melting temperature of the charge, the size of the canopy; the desired final composition of the metal in the container; and general process temperatures. Usually, the flow rate is high enough to result in an excess amount of the gaseous elemental component under the canopy, as described above. (The excess amount is based on moles of the actual element or elements which are being incorporated into the molten metal, e.g., moles of nitrogen when various nitrogen oxide compounds are employed).

One non-limiting example for gas flow rates can be provided, in the case of feeding nitrogen gas into a molten, niobium-silicide compound having a volume of about 5-10 cc. In that instance, the nitrogen gas flow rate usually ranges from about 30 cc/min to about 10,000 cc/min, and more often, from about 350 cc/min to about 3,000 cc/min. Those skilled in the art will be able to determine the most appropriate flow rate for a given selection of feed-gas compounds and molten metal charges. The duration of flow is also determined in part from flow rate, gas composition, the volume of molten metal, and the desired products after incorporation of the gaseous elemental component. In the case of a niobium-silicide compound having the indicated volume in the container, nitrogen flow is typically carried out at about 800 cc/min to about 2,000 cc/min, for about 2 minutes to about 30 minutes. Analysis of the resulting composition after solidification (e.g., bulk chemical analysis techniques) can provide an indication as to the sufficiency of gas flow rate and gas flow duration.

The incorporation of elemental components in the gaseous state has significant advantages over other methods for accomplishing such a task, e.g., solid material sources. The use of solid materials for the elemental component can lead to incomplete mixing, with lack of accurate control over the final product. Moreover, if the elemental component is in solid particle form, the presence of the particles may cause other problems with the properties of the final products, e.g., fatigue and strength properties.

As an illustration, if nitrogen were to be supplied to a molten metal charge in powder form, e.g., by way of titanium nitride or aluminum nitride particles, the solid particles may serve as nucleation sites when the final metal material is solidified. The nucleation sites may become defects, i.e., points of weakness and potential failure for articles eventually cast from the metal product. Use of a gaseous elemental source may minimize or eliminate such a problem.

Moreover, when the gaseous elemental source is employed, the use of the canopy described herein results in more intimate, direct contact between the gas and the molten metal composition. The gas, such as nitrogen, can be directed specifically and efficiently to the surface of the molten metal pool. Since alloy properties (e.g., in the case of niobium suicides) are often very sensitive to nitrogen concentration, this controlled addition of nitrogen can more precisely ensure a desired phase-content and microstructure in the final alloy.

After sufficient amounts of the gaseous elemental component have been incorporated into the molten metal charge, the molten metal can be solidified. Usually, solidification is carried out by simply bringing the temperature of the molten metal below its melting temperature. For example, induction power to the container can be reduced or shut-off, and the container can be allowed to cool in a protected environment such as argon. Other cooling techniques are also possible. As an example, the feed gas entering the chamber (e.g., through conduit 46 in FIG. 1) can be switched to an inert gas like argon or helium, to accelerate cooling of the solidifying metal. Alternatively, the container can be separated from the rest of the apparatus, for cooling.

In some preferred embodiments, the molten metal is solidified by a directional solidification (DS) technique. DS techniques are well-known in the art (e.g., the Bridgman technique), and described, for example, in U.S. Pat. No. 6,059,015 (referenced above), and U.S. Pat. No. 4,213,497 (Sawyer), which is also incorporated herein by reference. DS techniques generally involve unidirectional solidification of the molten metal material, and this results in good phase alignment in the growth direction.

One specific DS technique is sometimes used when the molten metal charge has been processed in an apparatus like that described herein, e.g., with a cooled, segmented crucible employed in an induction skull melting system. Such a process is described in U.S. Pat. No. 6,059,015. As described above, application of the electromagnetic field by the induction mechanism causes the molten metal charge to at least partially levitate within the walls of the crucible. The charge can then be solidified, e.g., by reducing the induction power. After solidification, the charge can be re-melted, so as to homogenize the material. After re-melting, the crucible is separated from the electromagnetic field, so as to cause unidirectional solidification of the melt, which eventually results in a directionally-solidified article. Such a technique is advantageous because it minimizes or eliminates interaction between the crucible walls and the molten metal, thereby decreasing the risk of contamination of the molten metal.

Separation of the crucible from the electromagnetic field can be carried out by various techniques. With reference to FIG. 1, canopy 40 can be removed after the gas feed is terminated, and container 12 can be raised up, so that it is no longer surrounded by coil 30. As described in U.S. Pat. No. 6,059,015, the withdrawal rate for the container is carefully controlled, according to known DS procedures for a given type of molten metal material. Alternatively, container 12 can be lowered from the rest of the apparatus (see directional arrows) by any suitable mechanism. As still another alternative, coil apparatus 30 can be withdrawn in the downward direction (or upwardly), which also effectively separates the coil from the container. Moreover, in some instances, it may be desirable to repeat the steps of solidifying and re-melting the molten material, prior to the separating step.

As described previously, the molten metal charge often comprises a refractory metal intermetallic composite (RMIC) material. Examples include niobium-silicon alloys, i.e., niobium silicides. The present inventors have discovered that use of the process described herein results in new types of niobium-silicide alloys (sometimes referred to as "composites"). These alloys comprise niobium (Nb), silicon (Si), and nitrogen (N). Some niobium-silicide alloys (distinct from those of this invention) are described in the following references: U.S. Pat. No. 5,833,773 (Bewlay et al); U.S. Pat. No. 5,932,033 (Jackson et al); U.S. Pat. No. 6,419,765 (Jackson et al); and U.S. Pat. No. 6,676,381 (Subramanian et al), all incorporated herein by reference. Some of the preferred compositions for this invention comprise about 1 atom % to about 25 atom % Si, and about 0.005 atom % to about 10 atom % N (and all sub-ranges therebetween), with the balance Nb. A more preferred range for nitrogen is usually about 0.005 atom % to about 5 atom %, with an especially preferred range being about 0.005 atom % to about 2 atom %.

The alloys of this invention usually have a microstructure comprising a metallic Nb-base phase and an intermetallic metal silicide phase (e.g., Nb-silicide). However, they may include one or more other phases as well. The metallic Nb-phase is relatively ductile, while the intermetallic silicide phase is more brittle and stronger. These alloys may be considered to be a composite of a ductile metallic phase and a brittle strengthening phase, wherein the composite is formed in-situ upon solidification of the alloy. In some preferred embodiments, both the Nb-base phase and the metal silicide phase are alloyed with N. (As used herein, "alloy" is meant to describe a solid or liquid mixture of two or more metals, or one or more metals with one or more non-metallic elements).

The alloy compositions of this invention may further comprise at least one element selected from the group consisting of titanium (Ti), hafnium (Hf), chromium (Cr), and aluminum (Al). Ti and/or Hf are often preferred constituents. A typical range for Ti is about 2 atom % to about 30 atom % (based on total atom % for the alloy material), and preferably, about 12 atom % to about 25 atom %. A typical range for Hf is about 0.5 atom % to about 12 atom %, and preferably, about 2 atom % to about 8 atom %. A typical range for Cr is about 0.1 atom % to about 20 atom %, and preferably, about 2 atom % to about 8 atom %. A typical range for Al is about 0.1 atom % to about 15 atom %, and preferably, about 0.1 atom % to about 4 atom %.

The alloy compositions may also comprise additional elements. Non-limiting examples are molybdenum, yttrium, rhenium, tantalum, zirconium, iron, tungsten, and tin. The particular inclusion and amount for any of these elements will of course depend on a variety of factors, such as the desired properties for the final alloy product.

The composition of the metal silicide phase can vary significantly. Factors which influence the final composition include: the particular starting constituents in the metal composite-product; the type and amount of gaseous elemental component incorporated therein; and the processing conditions (e.g., solidification technique). In some embodiments, the metal silicide phase comprises an $M_3Si$ silicide, where M is selected from the group consisting of Nb, Ti, and Hf. In other embodiments, the metal silicide phase comprises an $M_5Si_3$ silicide, where M is as described above. The microstructure of the alloy may contain other phases as well, and some of them are included in the Examples. One non-limiting example is based on a composite of Nb and $Nb_5Si_3$.

One niobium-silicide-based RMIC which is preferred for some embodiments of this invention comprises:
(I) about 10 atom % to about 30 atom % Ti;
(II) about 0.5 atom % to about 12 atom % Hf;
(III) about 2 atom % to about 20 atom % Cr;
(IV) about 0.1 atom % to about 10 atom % Al;
(V) about 2 atom % to about 25 atom % Si; and
(VI) about 0.005 atom % to about 5 atom % N;
with a balance of Nb.

As mentioned above, RMIC materials often exhibit good strength characteristics which provide advantages for various structural components. The nitrogen-modified RMIC materials may enhance the properties of a number of structural components, such as turbine engine parts (e.g., airfoils). For example, the turbine components could greatly benefit from nitrogen-containing RMIC's which improve strength at high and low temperatures. Thus, another embodiment of this invention is directed to turbine engine components formed, at least in part, from a niobium-base composite, comprising Nb, silicon (Si), and nitrogen (N), and having a microstructure comprising a metallic Nb-base phase and a metal silicide phase. Non-limiting examples of such components include turbine buckets, nozzles, blades, rotors, vanes, and stators.

EXAMPLES

The following examples are merely illustrative, and should not be construed to be any sort of limitation on the scope of the claimed invention. All parts are provided in weight percent, unless otherwise indicated.

Example 1

A photograph of an induction skull melting (ISM) apparatus according to this invention is shown as FIG. 2. The experimental apparatus 100 included a canopy 104, which rested over the top of a water-cooled, multi-segmented copper crucible 126. (The lower section of the crucible is visible; its upper section is covered by induction coil 108). The crucible had a height of about 14 cm; an outside diameter of about 4.5 cm, and an inner depth of about 2.5 cm. Its outside walls were formed by 16 vertical segments, each having a gap of about 0.4 mm between adjacent segments.

The induction coil 108 was formed of copper tube, with an outside diameter of about 1 cm. The coil, wrapped around the crucible as shown, was connected to power input and output cables 112, 116, respectively, by a conventional coupling. The cables were in turn connected to a 50 kW RF power supply, operating at 250 kHz. Power cables 112 and 116, also made of copper tube, were hollow, and water-cooled. The sidewall and base of crucible 126 were water-cooled with a separate cooling system (not shown in FIG. 2).

With continued reference to FIG. 2, canopy 104 was made of quartz glass, having an average thickness of about 2.4 mm. The height of the canopy was about 4 cm above the top of the induction coil. The generally vertical sides of the canopy extended down about 4.5 cm below the top of the coil, which was about 3.5 cm below the upper lip of the crucible. A gap of less than about 1 mm remained between the lower wall of the canopy and the outside surface of the crucible. Six vent holes 105, each having a diameter of about 5 mm, were formed in the canopy, for gas-venting purposes.

The top of the canopy terminated in a circular opening 120, having a diameter of about 6 mm. A gas-feed hose 124, made of flexible copper tubing, was connected to the canopy opening by way of a standard compression fitting. The opposite end (not shown) of the hose was connected to a pressurized gas tank which contained pure nitrogen gas.

The bottom of crucible 126 was situated on metal support shaft 128. The support shaft was connected to a conventional elevator mechanism, not fully shown. The elevator mechanism allowed the crucible to be lifted to its operational position (i.e., as shown, surrounded by coil 108), or to be lowered and controllably withdrawn from that position.

The entire apparatus 100 was enclosed in a conventional, stainless steel reaction chamber. (One of the inside walls of the chamber is labeled as element 132 in FIG. 2). The chamber was sealed, evacuated, and then back-filled with an inert gas.

Approximately 50 g of a solid alloy mixture (Sample 1) was initially placed in the crucible, prior to putting canopy 104 into place. The nominal composition of this first sample was as follows: 46.85 g niobium and 3.15 g silicon (a eutectic composition). This was equivalent to about 18.2 atom % silicon, with the balance being niobium. This charge was sufficient to fill about 50% of the inner volume of the crucible.

After the canopy was put into place, the power input to the induction coil was turned on, and was gradually raised to about 30 kW (250 kHz). This power level brought the solid mixture to a liquid-melt (i.e., a temperature of about 1920° C., which was about 40° C. above the melting temperature of the alloy). The power input was maintained at that level (30 kW, 250 kHz) during the process. When the mixture had thoroughly melted, nitrogen gas flow for the nitriding step was initiated, at a flow rate of about 1600 cc/min. This flow rate was sufficient to completely fill the area under the canopy after about 10 seconds. The gas flow was maintained for a period of about 20 minutes.

After the gas flow was terminated, the electrical power was turned off, and the molten charge cooled and solidified. Samples of the metal product were then cut off and analyzed by using a scanning electron microscope (SEM).

Example 2

The process was again carried out, as in Example 1, using the following, nominal charge of solid alloy material (Sample 2): 28.72 g Nb, 7.73 g Ti, 9.60 g Hf, 0.67 g Cr, 0.34 g Al, and 2.94 g Si. This charge is equivalent to the following composition, in atom %: 24.7 Ti, 8.2 Hf, 2.0 Cr, 1.9 Al, 16 Si, balance Nb. The designated power level of 30 kW brought the sample mixture to a liquid-melt, i.e., a temperature of about 1875° C. Nitriding was carried out for about 10 minutes, followed by the directional solidification step described above. Appropriate samples from the solidified material were then analyzed as described previously.

Figure 3:
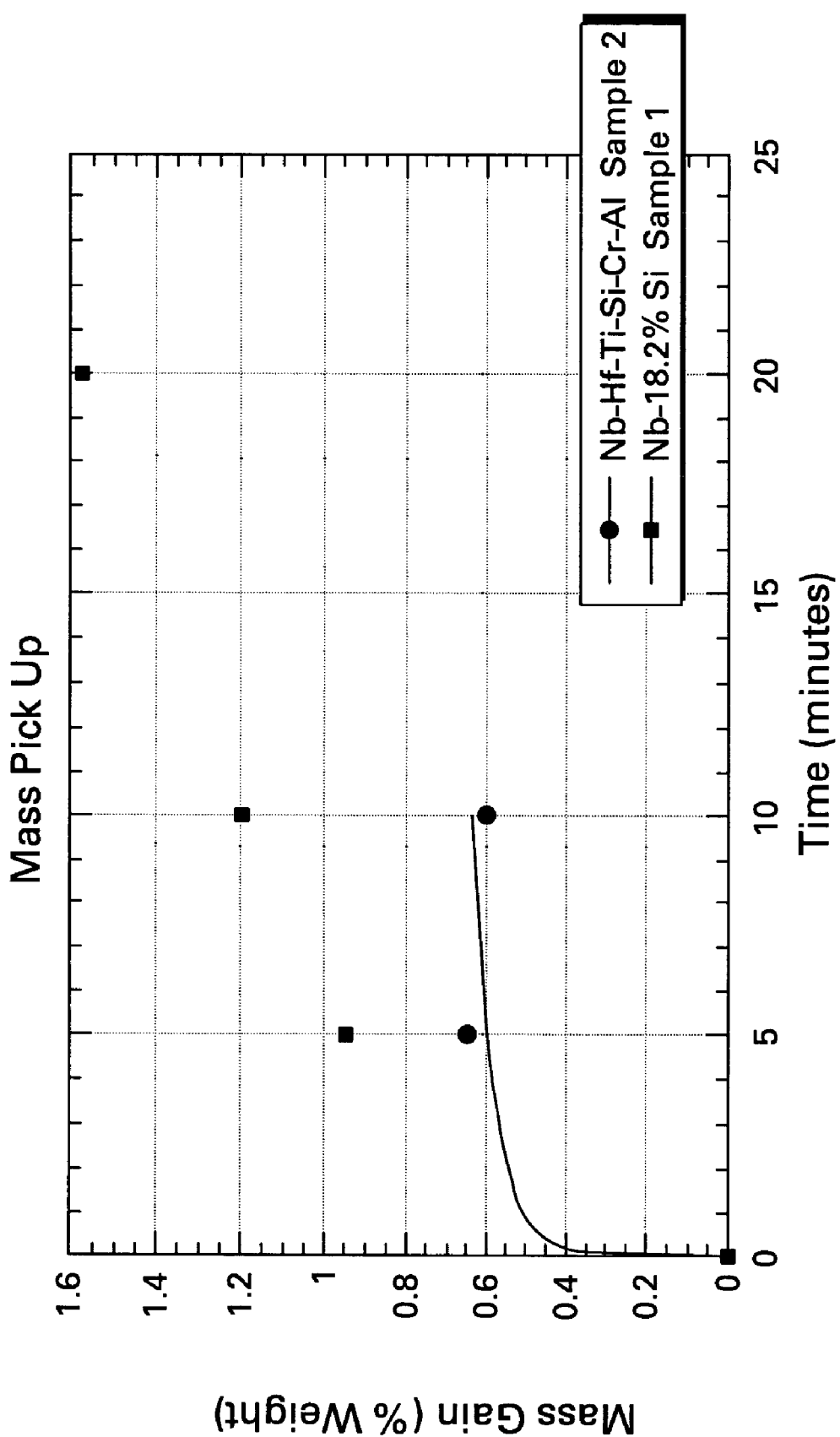
FIG. 3 is a graphical representation of mass gain as a function of time, for samples prepared by the present invention.

FIG. 3 is a graphical representation of mass gain, due to nitrogen incorporation, as a function of time, for samples 1 and 2. For the binary alloy of sample 1, the rate of mass uptake was nearly a linear function of time, after 5 minutes had elapsed. In this instance, a mass uptake of about 1.6 weight percent of nitrogen occurred after the 20 minute exposure-period. In the case of sample 2, i.e., the six-element alloy, the mass uptake substantially leveled out after about 10 minutes. In other words, the equilibrium concentration of nitrogen had been reached at that point.

Figure 4:
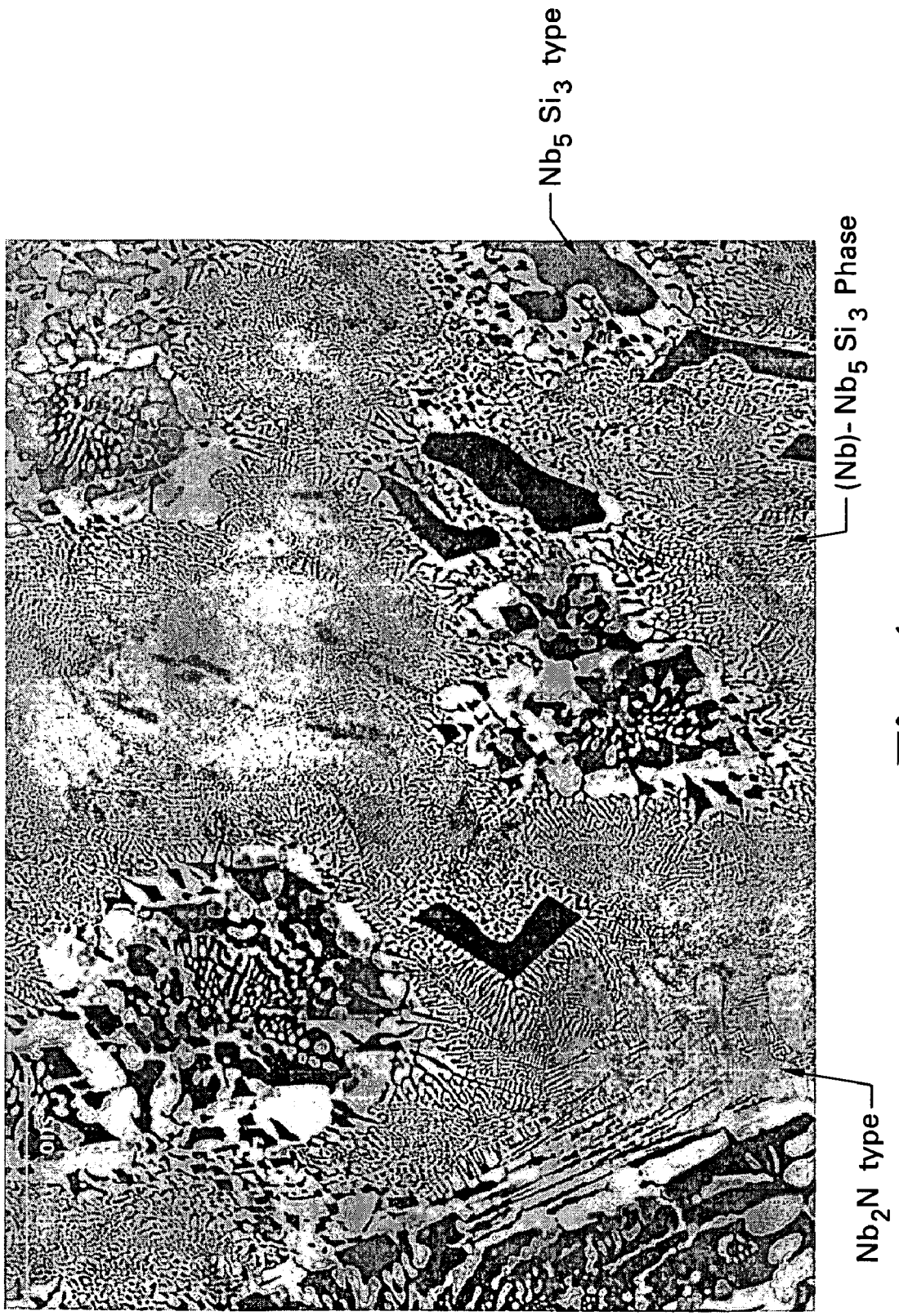
FIG. 4 is a photomicrograph of the microstructure of an alloy according to the present invention.

FIG. 4 is a photomicrograph (using SEM) of the microstructure of the alloy of sample 1, prior to any directional solidification. (The Nb-18.2 atom % silicon alloy had been modified with 8.1 atom % N). The final alloy composition was about 16.7 atom % Si, 8.1 atom % N, balance-Nb. As indicated in the figure, the microstructure contained large-scale $Nb_2N$ and $Nb_5Si_3$ dendrites, along with a composite of Nb and $Nb_5Si_3$.

Figure 5:
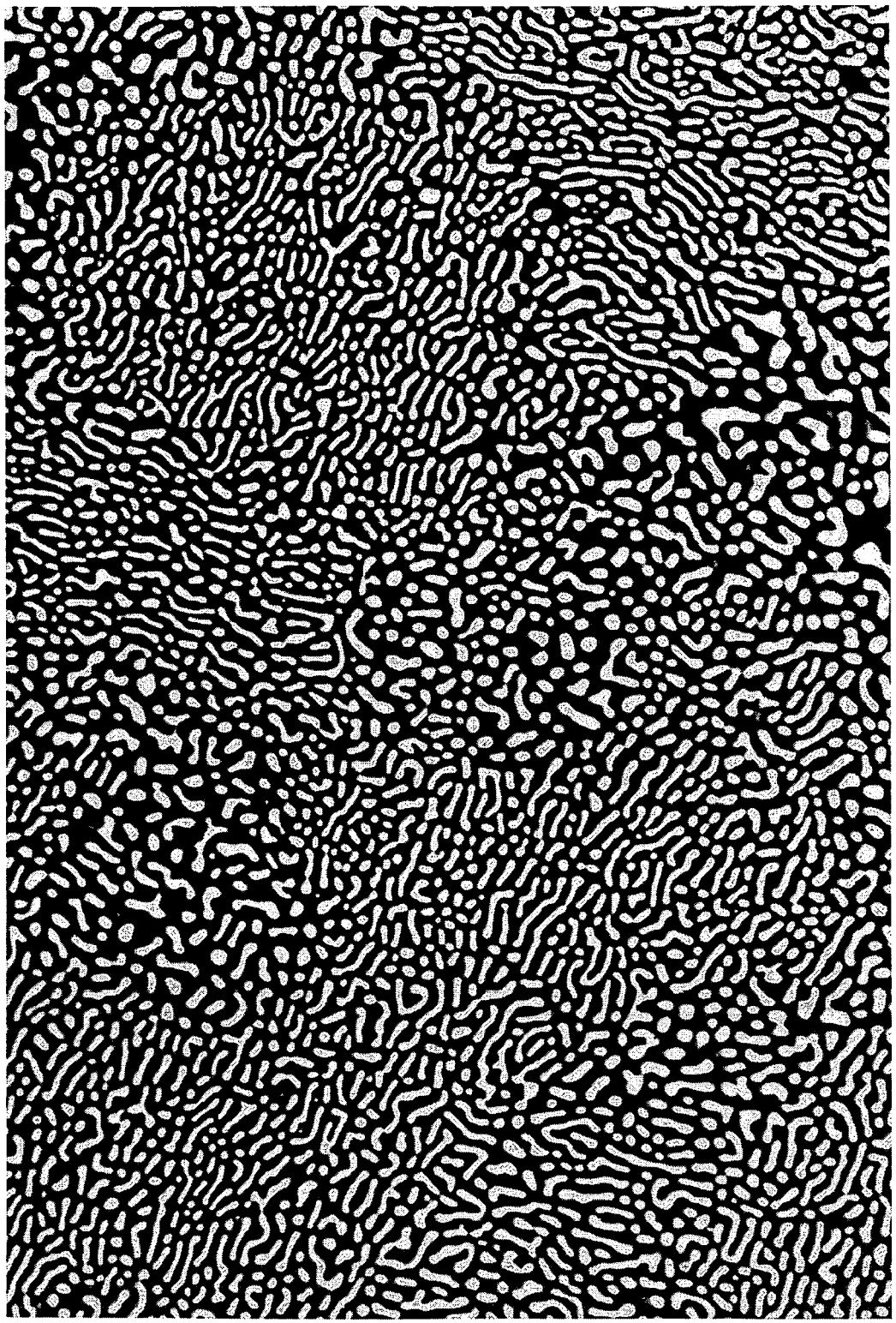
FIG. 5 is a photomicrograph of the microstructure of an alloy outside the scope of the present invention.

The type of structure depicted in FIG. 4 differs from that of the binary Nb—Si alloy, i.e., one in which nitrogen was not incorporated by the process described herein. A microstructure of such an alloy is depicted in FIG. 5. Its "salt-and-pepper" appearance is clearly evident. It is readily apparent that such a structure, representing a composite of Nb and $Nb_3Si$, is radically different from that of the nitrided alloy.

The addition of nitrogen to the binary Nb—Si phase stabilizes the $Nb_5Si_3$, leading to equilibrium between liquid, Nb, and $Nb_5Si_3$. In the simple binary system, equilibrium between liquid, Nb and $Nb_5Si_3$ is not possible because of the presence of the peritectic involving $Nb_3Si$. Thus, the addition of nitrogen has led to a change in the nature of the composite, and the composition at which the composite forms. Given the higher melting temperature of the $Nb_5Si_3$ phase, it is probably highly advantageous to be able to stabilize $Nb_5Si_3$ directly. The presence of nitrogen also leads to the formation of Nb-silicon-nitride compounds.

Figure 6:
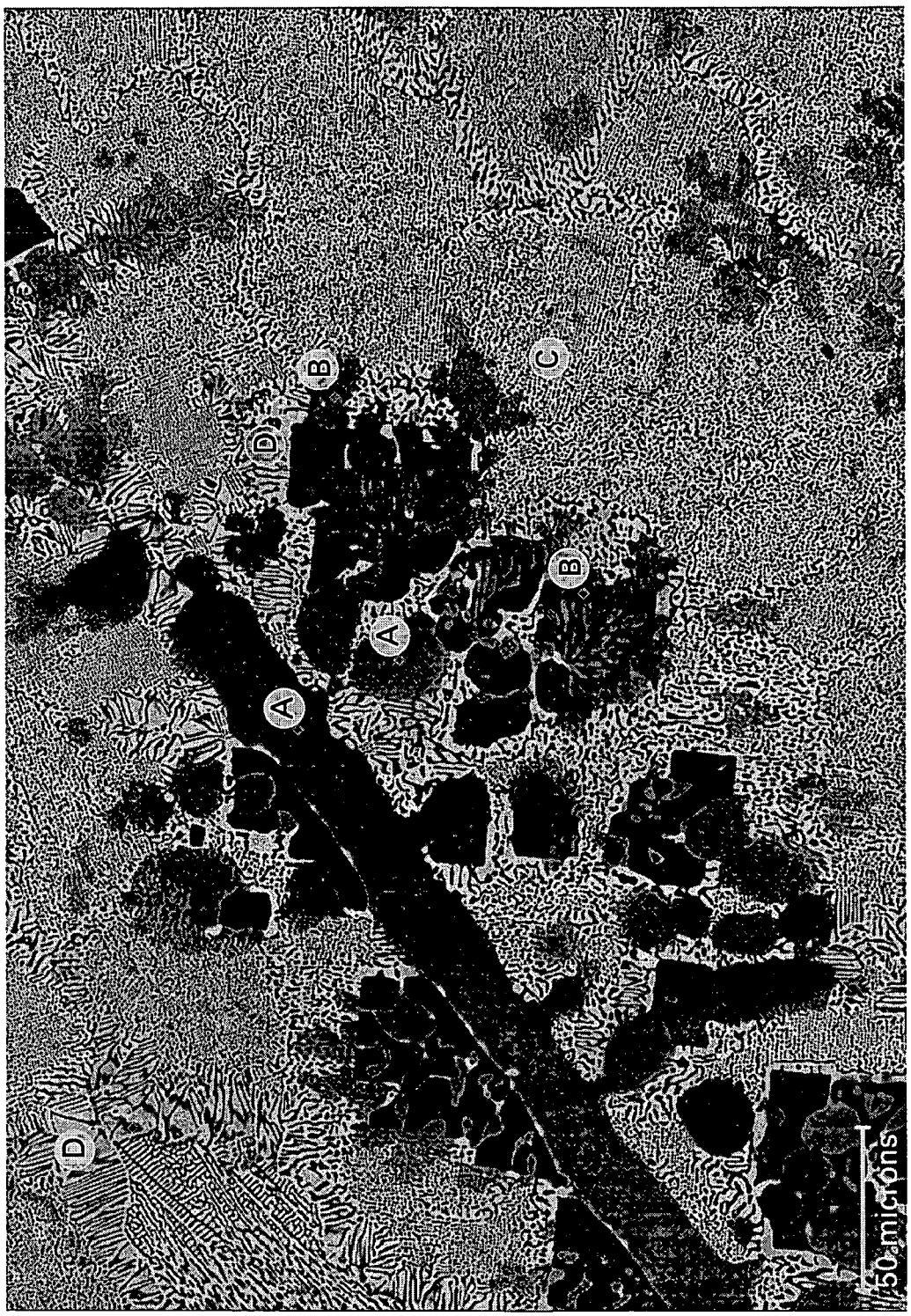
FIG. 6 is a photomicrograph of the microstructure of the alloy of FIG. 4, after directional solidification.

FIG. 6 is a photomicrograph of a microstructure of a nitrided alloy, having a composition as follows: 16.7 atom % Si, 8.1 atom % N, balance-Nb. The alloy was prepared by a process substantially identical to that of Example 1, but with a directional solidification step. The DS step was carried out by withdrawing the crucible from its operational position (i.e., lowering shaft 128 in FIG. 2). Withdrawal was carried out at a rate of about 1 mm/min, to directionally solidify the metal product. (Numerals superimposed over the figure are miscellaneous markers, and can be ignored).

The transverse sections of the microstructure in FIG. 6 show large-scale $Nb_2N$-type dendrites that possess the hP9 crystal structure (e.g., Region A). (However, at lower nitrogen levels, the $Nb_2N$-type dendrites may not be present). There are also large-scale $Nb_5Si_3$-type dendrites (Region B). A finescale, interdendritic composite of Nb and $Nb_5Si_3$ is also shown (Region C). Exemplary areas with the Nb phase are indicated as region D. This structure is significantly different from a $Nb_3Si$—Nb composite (without N) generated by the directional-solidification of the Nb-18.2 atom % Si alloy.

Having thus described the invention in rather full detail, it will be understood that such detail need not be strictly adhered to, and that various changes and modifications may suggest themselves to one skilled in the art, all falling within the scope of the invention as defined by the appended claims.

What is claimed:

1. An apparatus for incorporating an elemental component in gaseous form into a molten metal, comprising:
   (a) a container for holding the molten metal, having a sidewall, a top, and a bottom, which define an interior of the container;
   (b) means for cooling the container;
   (c) heating means for maintaining the metal in the molten state; and
   (d) a canopy which covers the top of the container and extends over the sidewall of the container, said canopy including at least one aperture through which a gas conduit communicates, wherein a first end of the conduit is attached to a gas source for the elemental component.

2. The apparatus of claim 1, wherein the container is a metal crucible.

3. The apparatus of claim 2, wherein the metal for the crucible is selected from the group consisting of copper, molybdenum, tungsten, tantalum, and alloys of any of the foregoing.

4. The apparatus of claim 2, wherein the sidewall of the crucible is water-cooled.

5. The apparatus of claim 2, wherein the sidewall of the crucible is divided into segments by gaps.

6. The apparatus of claim 5, wherein the means for cooling the sidewall comprises a coolant passage internal of at least one of the segments, and means for supplying coolant to each coolant passage.

7. The apparatus of claim 5, wherein the segments are disposed in side-by-side relation about a longitudinal axis of the crucible, each segment having an inner wall facing the axis for forming, along with the other segments, an interior region of the crucible for holding the molten metal.

8. The apparatus of claim 7, wherein each gap includes an inner portion communicating with the interior region of the crucible, and an outer portion communicating with the exterior of the sidewall.

9. The apparatus of claim 1, wherein the heating means of element (c) comprises an induction mechanism which is capable of inducing an electrical current which heats the metal within the container, so as to melt the metal.

10. The apparatus of claim 9, wherein the induction mechanism comprises an induction heating coil which coaxially surrounds the container.

11. The apparatus of claim 1, wherein the canopy is formed of a material selected from the group consisting of glass, ceramics, high-temperature polymers, and combinations thereof.

12. The apparatus of claim 11, wherein the canopy is formed of quartz glass.

13. The apparatus of claim 1, wherein the canopy is substantially dome-shaped.

14. An apparatus for incorporating an elemental component in gaseous form into a molten metal, said apparatus comprising a water-cooled, multi-segmented crucible to which an induction heating mechanism is attached, wherein the top of the crucible is covered with a removable canopy which extends over a sidewall of the crucible: and wherein the canopy is capable of controllably admitting the elemental component to a region under the canopy and over the molten metal in the crucible.

15. The apparatus of claim 14, wherein the crucible is formed of copper, and comprises a portion of an induction skull melting apparatus.

16. The apparatus of claim 1, further comprising an enclosure which contains the apparatus.

17. The apparatus of claim 16, wherein the enclosure is a chamber which includes a vacuum-producing mechanism.

18. An apparatus for incorporating an elemental component in gaseous form into a molten metal, comprising:
   (a) a container for holding the molten metal, having a sidewall, a top, and a bottom, which define an interior of the container;
   (b) means for cooling the container;
   (c) heating means for maintaining the metal in the molten state;
   (d) a canopy which covers the top of the container and includes at least one aperture through which a gas conduit communicates, wherein
   a first end of the conduit is attached to a gas source for the elemental component; and
   (e) an enclosure which contains the apparatus, wherein the enclosure is a chamber which includes a vacuum-producing mechanism.

* * * * *